United States Patent
Song et al.

(10) Patent No.: US 9,485,719 B2
(45) Date of Patent: Nov. 1, 2016

(54) METHOD AND DEVICE FOR SEARCHING FOR SUPPORTED SERVICE THROUGH WIFI DIRECT NETWORK

(71) Applicant: LG ELECTRONICS INC., Seoul (KR)

(72) Inventors: Jaehyung Song, Seoul (KR); Kyungchul Kwak, Seoul (KR); Suhwook Kim, Seoul (KR); Inhwan Choi, Seoul (KR); Wongyu Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 126 days.

(21) Appl. No.: 14/358,621

(22) PCT Filed: Nov. 14, 2012

(86) PCT No.: PCT/KR2012/009608
§ 371 (c)(1),
(2) Date: May 15, 2014

(87) PCT Pub. No.: WO2013/073838
PCT Pub. Date: May 23, 2013

(65) Prior Publication Data
US 2014/0314065 A1 Oct. 23, 2014

Related U.S. Application Data

(60) Provisional application No. 61/560,261, filed on Nov. 15, 2011, provisional application No. 61/560,269, filed on Nov. 15, 2011.

(51) Int. Cl.
| | |
|---|---|
| *H04W 48/16* | (2009.01) |
| *H04W 8/00* | (2009.01) |
| *H04L 29/08* | (2006.01) |
| *H04W 4/08* | (2009.01) |
| *H04W 84/12* | (2009.01) |

(52) U.S. Cl.
CPC .............. *H04W 48/16* (2013.01); *H04L 67/16* (2013.01); *H04W 4/08* (2013.01); *H04W 8/005* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2003/0140119 A1* | 7/2003 | Acharya | ................. H04L 29/06 709/219 |
| 2004/0003058 A1 | 1/2004 | Trossen | |

(Continued)

FOREIGN PATENT DOCUMENTS

| | | | |
|---|---|---|---|
| KR | 10-2011-0073239 | 6/2011 | |
| WO | WO-2011062404 A2 * | 5/2011 | ............ H04W 48/16 |

OTHER PUBLICATIONS

PCT International Application No. PCT/KR2012/009608, Written Opinion of the International Searching Authority dated Mar. 28, 2013, 19 pages.

*Primary Examiner* — Charles C Jiang
*Assistant Examiner* — George Atkins, Jr.
(74) *Attorney, Agent, or Firm* — Lee, Hong, Degerman, Kang & Waimey; Jonathan Kang; Richard Salfelder

(57) ABSTRACT

The present invention relates to a method and device that may determine a service provided by a WiFi device to be connected before connecting a WiFi direct network. According to at least one embodiment of the present invention, if a service for an owner device of a wireless communication group is discovered for in the process of discovering for a service for the wireless communication group, there is the advantage that is possible to more conveniently perform the service discovery process by obtaining supported service information on each device belonging to the group. In addition, if there is a currently unavailable service in the process of discovering for the service for the wireless communication group, there is the advantage that it is possible to provide information highly necessary for a user to determine network establishment by further providing information on the unavailable service.

17 Claims, 24 Drawing Sheets

(56) References Cited

U.S. PATENT DOCUMENTS

| | | |
|---|---|---|
| 2009/0239469 A1 | 9/2009 | Rangarajan et al. |
| 2011/0105024 A1* | 5/2011 | Palin ................... H04W 8/005 455/41.2 |
| 2011/0116458 A1* | 5/2011 | Hsu ....................... H04W 16/14 370/329 |
| 2012/0243524 A1* | 9/2012 | Verma ................... H04W 48/08 370/338 |

* cited by examiner

FIG. 5A

| Field Name | OUI Subtype | Service TLV |
|---|---|---|
| Size (Octets) | 1 | Variable |
| Value(Example) | 0X09 | Service Request : Fig. 5b<br>Service Response : Fig. 5d |

FIG. 5B

Service TLV of Service Discovery Request frame

| Field Name | Length | Service Protocol Type | Service Transaction ID | Query Data |
|---|---|---|---|---|
| Size (Octets) | 2 | 1 | 1 | Variable |
| Value(Example) | Variable | Fig. 5c | Variable | NA |

FIG. 5C

Service Protocol Type

| Bit Location | Value | Meaning(Example) |
|---|---|---|
| 0-6 | 0 | All Services |
| | 1 | Bonjour |
| | 2 | UPnP |
| | 3 | Wi-fi Display |
| | 4~127 | Reserved |
| 7 | 0 | Service information request of receiving device |
| | 1 | All service information request of group of receiving devices |

FIG. 5D

Service TLV of Service Discovery Response frame

| Field Name | Length | Service Protocol Type | Service Transaction ID | Status Code | Response Data |
|---|---|---|---|---|---|
| Size (Octets) | 2 | 1 | 1 | 1 | Variable |
| Value(Example) | Variable | Fig. 5c | Variable | Fig. 5e | Fig. 7a |

FIG. 5E

Status Code

| Bit Location | Value | Meaning |
|---|---|---|
| 0~7 | 0 | Success |
| | 1 | Service Protocol Type not available |
| | 2 | Requested information not available |
| | 3 | Bad Request |
| | 4-255 | Reserved |

FIG. 5F

P2P group capability bitmap

| Bit(s) Location | Information |
|---|---|
| 0 | P2P Group Owner |
| 1 | Persistent P2P Group |
| 2 | P2P Group Limit |
| 3 | Intra-BSS Distribution |
| 4 | Cross Connection |
| 5 | Persistent Reconnect |
| 6 | Group Formation |
| 7 | Service Broadcast |

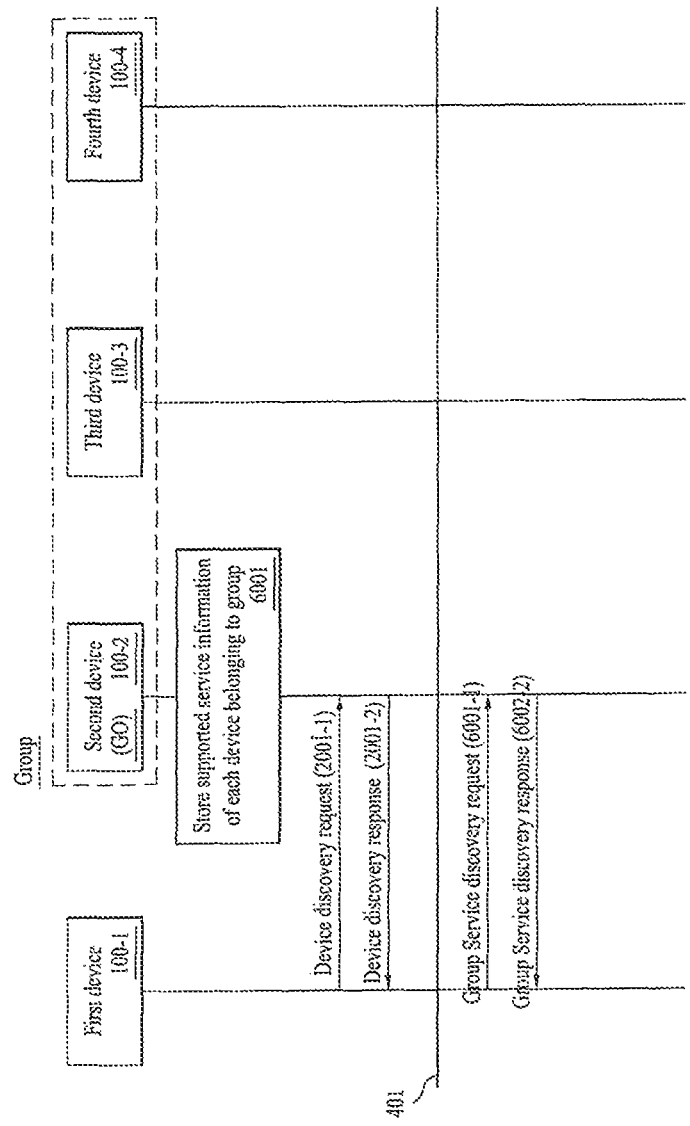

Service TLV of Group Service Discovery Response frame

| Field Name | Length | Service Protocol Type | Service Transaction ID | Status Code | Response Data for Group |
|---|---|---|---|---|---|
| Size (Octets) | 2 | 1 | 1 | 1 | Variable |
| Value(Example) | Variable | Fig. 5c | Variable | Fig. 5e | Fig. 7a Fig. 7b |

FIG. 9

Status Code

| Bit Location | Value | Meaning |
|---|---|---|
| 0~7 | 0 | Success |
| | 1 | Service Protocol Type not available |
| | 2 | Requested information not available |
| | 3 | Bad Request |
| | 4 | Service is currently avaiable |
| | 5 | Service is currently occupied |
| | 6 | Service availability is not sure |
| | 7~255 | Reserved |

FIG. 11A

Status Code

| Bit Location | Value | Meaning |
|---|---|---|
| 0~6 | 0 | Success |
| | 1 | Service Protocol Type not available |
| | 2 | Requested information not available |
| | 3 | Bad Request |
| | 4~127 | Service is currently available |
| 7 | 0 | Service Updated |
| | 1 | Service Not Updated |

FIG. 11B

Service Update Indicator Frame

| Field Name | Category | Action Field | OUI | OUI Type | Dialog Tocken | Update Data |
|---|---|---|---|---|---|---|
| Size (Octets) | 1 | 2 | 2 | 1 | 1 | Variable |
| Value (Example) | | | | | | Fig. 11c |

FIG. 11C

Update Data

| Field Name | Service Update Indicator | Length | Service Protocol Type | Service Transaction ID | Status Code | Update Data |
|---|---|---|---|---|---|---|
| Size (Octets) | 2 | 2 | 1 | 1 | 1 | Variable |
| Value (Example) | | | | | | Fig. 11a |

FIG. 12
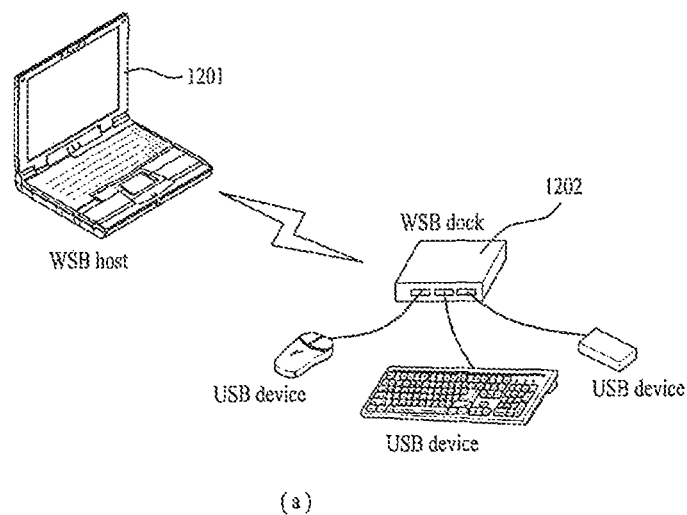
(a)
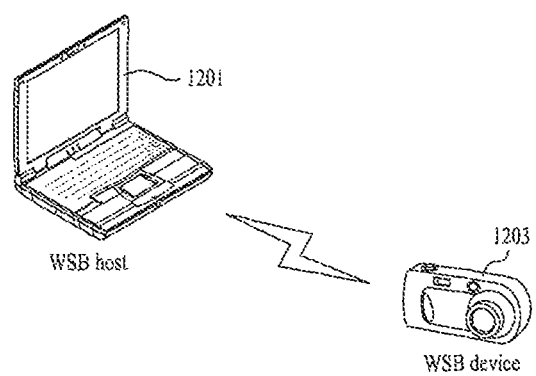
(b)

FIG. 13
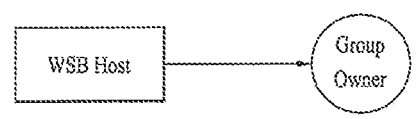
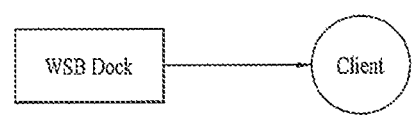
(a)
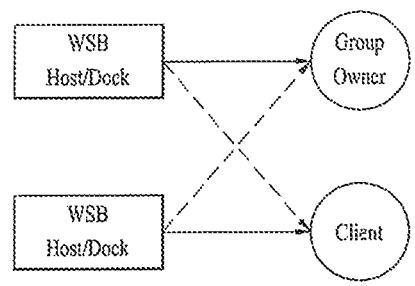
(b)

FIG. 15A

WSB IE

| Field | Size (Octects) | Value (Hexadecimal) | Description |
|---|---|---|---|
| Element ID | 1 | DD | IEEE 802.11 vendor specific usage |
| Length | 1 | Variable | Length of the following fields in the IE in octects. The length field is variable and set to 4 plus the total of WSB subelements. |
| OUI | 3 | 50 6F 9A | WFA specific OUI |
| OUI Type | 1 | TBD | Identifying the type or version of the WSB IE. Setting to "TBD" indicates WFA WSB v1.0 |
| WSB Subelements | Variable | Fig. 15b | One or more WSB subelements appear in the WSB IE |

FIG. 15B

WSB Subelements

| Field | Size (Octects) | Value (Hexadecimal) | Description |
|---|---|---|---|
| Subelement ID | 1 | | Identifying the type of WSB subelement. |
| Length | 1 | Variable | Length of the following fields in the subelements |
| Subelements body field | Variable | Fig. 15c | Subelement specific information fields |

FIG. 15C

Subelements body field

| Field | Size (Octects) | Value (Hexadecimal) | Description |
|---|---|---|---|
| Subelement ID | 1 | 0 | Identifying the type of WSB subelement. |
| Length | 1 | Variable | Length of the following fields in the subelements body field |
| WSB Device Information | 1 | Fig. 15d | Bitmap defined in Fig. 15d detailing WSB Device information |

FIG. 15D

WSB Device Information

| Bit Location | Value | Meaning (Hexadecimal) | |
|---|---|---|---|
| 0~1 | 0(0b00) | The device is WSB Host only device | Attribute information of device |
| | 1(0b01) | The device is WSB Dock only device | |
| | 2(0b10) | The device is WSB Host/Dock device | |
| | 3(0b11) | Reserved | |
| 2~3 | 0(0b00) | The device is intended to operate as a WSB Host | Intended operation information of device |
| | 1(0b01) | The device is intended to operate as a WSB Dock | |
| | 2(0b10) | The device is open to the mode of operation. | |
| | 3(0b11) | Reserved | |
| 4~5 | 0(0b00) | Not available for WSB paring | WSB Pairing support information |
| | 1(0b01) | Available for WSB paring | |
| | 2(0b10)~ 3(0b11) | Reserved | |
| 6 | 0(0b0) | WSB Service Discovery : Not supported | WSB Service Discovery support information |
| | 1(0b1) | WSB Service Discovery : supported | |
| 7~8 | - | Reserved | |

METHOD AND DEVICE FOR SEARCHING FOR SUPPORTED SERVICE THROUGH WIFI DIRECT NETWORK

CROSS-REFERENCE TO RELATED APPLICATIONS

This application is the National Stage filing under 35 U.S.C. 371 of International Application No. PCT/KR2012/009608, filed on Nov. 14, 2012, which claims the benefit of U.S. Provisional Application Ser. No. 61/560,261, filed on Nov. 15, 2011, and 61/560,269, filed on Nov. 15, 2011, the contents of which are all hereby incorporated by reference herein in their entirety.

FIELD OF THE INVENTION

The present invention relates to a device that can realize usage of a WiFi direct device with more consideration to user convenience and a method for controlling the same.

BACKGROUND ART

A Wi-Fi Direct Network has been proposed by the Wi-Fi Alliance (hereinafter referred to as WFA) as a network that can connect Wi-Fi Devices to one another via Peer to Peer connection, even if the Wi-Fi Devices to not participate in a home network, an office network, and a hotspot network.

The devices within the Wi-Fi Direct Network should be capable of discovering for ability information respective to one another.

In case of a mobile Wi-Fi device, when it is considered that the mobile Wi-Fi device is provided with low battery capacity, by providing capability information to the user prior to establishing the connection, decision may be made as to whether or not to establish connection.

Therefore, diverse methods for efficiently providing the user with supported service information of the Wi-Fi devices are being required.

DETAILED DESCRIPTION OF THE INVENTION

Technical Objects

As a method for meeting with the above-described requirements, an object of the present invention is to provide a Wi-Fi device enabling a supported service of a device, which the Wi-Fi device intends to establish connection with, to be efficiently determined, prior to establishing Wi-Fi direct connection, and to provide a service discovery method of the same.

The technical objects of the present invention will not be limited only to the technical objects described above. Accordingly, technical objects that have not been mentioned above or additional technical objects of the present application may become apparent to those having ordinary skill in the art from the description presented below.

Technical Solutions

In order to achieve the technical object, the present invention provides a step of generating a Service discovery request frame configured to discover services supported by each device belonging to a wireless communication group, a step of transmitting the generated Service discovery request frame to an Owner device among the devices belonging to the wireless communication group, and a step of receiving a Service discovery response frame including information on services provided by each of the devices belonging to the wireless communication group, from the Owner device as a response to the Service discovery request frame.

Additionally, in order to achieve the technical object, the present invention provides a step of receiving, by an Owner device, a Service discovery request frame configured to discover services supported by each device belonging to the wireless communication group from the predetermined device, a step of generating, by the Owner device, a Service discovery response frame including information on services provided by each of the devices belonging to the wireless communication group with respect to the received Service discovery request frame, and a step of transmitting the generated Service discovery response frame to the predetermined device.

Effects of the Invention

The effects of the Wi-Fi device and the service discovery method of the same according to the present invention will hereinafter be described.

According to at least one of the exemplary embodiments of the present invention, it is advantageous in that, prior to establishing connection through a Wi-Fi direct network, the supported service of a device that is intended to be connected can be easily identified, and that waste in power can be minimized.

Additionally, according to at least one of the exemplary embodiments of the present invention, it is advantageous in that, prior to establishing connection through a Wi-Fi direct network, since it may be determined as to whether or not the identified supported service is currently available for usage, additional information may be further provided to the user using the corresponding service.

The effects of the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

FIG. 5A to FIG. 5F respectively illustrate examples of each field of a service discovery request/discovery response frame according to an exemplary embodiment of the present invention.

FIG. 6 illustrates an exemplary method of collectively identifying a supporting service of each device belonging to the group according to another exemplary embodiment of the present invention.

FIG. 9 illustrates an example of including information on current availability or unavailability in a "Status Code" field within a service TLV of a group service discovery response frame according to an exemplary embodiment of the present invention.

FIG. 11A illustrates an example of a "Status Code" field included in a Service discovery response frame according to yet another embodiment of the present invention.

FIG. 11B illustrates an example of a service update notification frame according to an exemplary embodiment of the present invention.

FIG. 11C illustrates a detailed field configuration of an "Update data" field according to an exemplary embodiment of the present invention.

FIG. 12 illustrates a drawing for describing a method for deciding owner/client devices, when forming a wireless communication group according to yet another embodiment of the present invention.

FIG. 13 illustrates a schematic example of a method for pairing host/dock devices of a USB service protocol with owner/client devices within a Wi-fi Direct network.

FIG. 15A illustrates each field of WSB IE (Wi-Fi USB Information Elements) according to an exemplary embodiment of the present invention.

FIG. 15B illustrates an example of detailed segmented fields of a "WSB Subelements" field according to an exemplary embodiment of the present invention.

FIG. 15C illustrates an example of segmented fields of a "Subelements body field".

FIG. 15D illustrates an exemplary bit structure of "WSB Device Information" according to an exemplary embodiment of the present invention.

BEST MODE FOR CARRYING OUT THE PRESENT INVENTION

Figure 1:
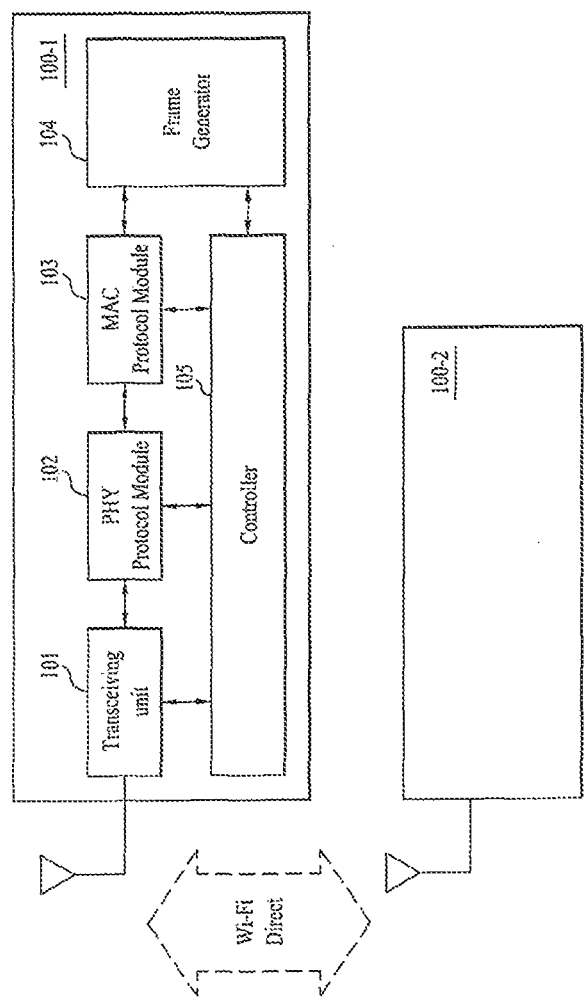
FIG. 1 illustrates a block view of a Wi-fi device (100) supporting a Wi-fi direct network according to an exemplary embodiment of the present invention.

Hereinafter, the preferred exemplary embodiment of the present invention will be described in detail with reference to the accompanying drawings. In the drawings, the same reference numerals will refer to the same elements, and the size of each element within the drawing may have been magnified for clarity in the description.

FIG. 1 illustrates a block view of a Wi-fi device (100) supporting a Wi-fi direct network according to an exemplary embodiment of the present invention.

Referring to FIG. 1, the Wi-fi device (100) may include a transceiving unit (101), a PHY protocol module (Physical Layer Protocol Module) (102), a MAC protocol module (Medium Access Control Protocol Module) (103), a frame generator (104), and a controller (105).

The transceiving unit (101) transceives (transmits/receives) data with another Wi-fi device (100-2) by using a Wi-Fi network. When the transceiving unit (101) receives information created by the PHY protocol module (102), the transceiving unit (101) relocates the received information to an RF spectrum (Radio-Frequency Spectrum) and transmits the corresponding information to the antenna by performing Filtering, Amplification, and so on. Additionally, the transceiving unit (101) relocates an RF signal (Radio Frequency Signal), which is received from the antenna, to a band that can be processed by the PHY protocol module (102) and executes a function of performing filtering. Furthermore, the transceiving unit (101) may also include a Switch function for switching to and from such transmitting and receiving functions.

When the PHY protocol module (102) receives a request for transmitting data from the MAC protocol module (103), the PHY protocol module (102) execute a function of performing processing, such as FEC encoding (Forward Error Correction Encoding), Modulation, inserting additional signals, such as a Preamble a pilot, and so on, on the required data and delivering the processed data to the transceiving unit (101).

Additionally, when the PHY protocol module (102) receives the signal received by the transceiving unit (101), the PHY protocol module (102) executes a function of delivering data to the MAC protocol module (103) by performing processes, such as Demodulation, Equalization, FEC Decoding (Forward Error Correction Decoding) on the delivered received signal and enhancing a signal added by the PHY (Physical layer). In order to perform such function, the PHY protocol module (102) may include a Modulator, a Demodulator, an Equalizer, an FEC encoder (Forward Error Correction encoder), and an FEC decoder (Forward Error Correction decoder).

The MAC protocol module (103) performs procedures required for delivering and transmitting data, which are delivered from an upper layer, to the PHY protocol module (102) and also performs the role of executing additional transmission for establishing basic (or essential) communication. In order to do so, the MAC protocol module (103) also performs the function of adequately processing the data requested to be transmitted by the upper layer for transmission, and processing the corresponding data for delivery and transmission to the PHY protocol module (102), and, additionally, the MAC protocol module (103) also performs the function of processing the received data delivered from the PHY protocol module (102) and delivering the processed data to the upper layer. Additionally, by performing other additional transception processes required to perform such data delivery, the MAC protocol module (103) may perform the role or function of processing a communication protocol.

In order to communication with the other Wi-fi device (100-2), the frame generator (104) generates a data frame, a request frame, and/or a response frame. Most particularly, with respect to the exemplary embodiment of the present invention, the frame generator (104) generates a service discovery request frame and/or a service discovery response frame. The service discovery request frame and/or the service discovery response frame will be described in more detail later on with reference to FIG. 5A to FIG. 5E.

The controller (105) generally controls the overall operations of the Wi-fi device (100).

Figure 2:
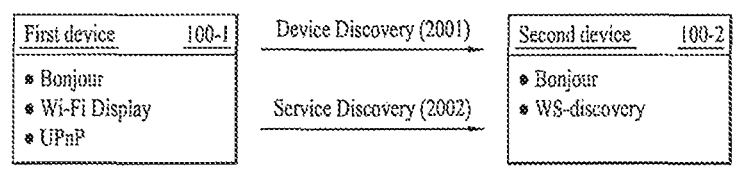
FIG. 2 illustrates a drawing showing a Wi-fi device (100) service discovery procedure in another Wi-fi direct network according to an exemplary embodiment of the present invention.

FIG. 2 illustrates a drawing showing a Wi-fi device (100) service discovery procedure in another Wi-fi direct network according to an exemplary embodiment of the present invention.

In FIG. 2, a first device (100-1) and a second device (100-2) are illustrated, and list of services supported by each device (100) is also illustrates inside the respective device (100). According to the example shown in FIG. 2, the services supported by the first device (100-1) correspond to Bonjour, Wi-Fi Display, UPnP (Universal Plug And Play), and the services supported by the second device (100-2) correspond to Bonjour and WS-Discovery (Web Service Dynamic Discovery).

A Wi-Fi Direct Network may include at least one Wi-Fi device including the first device (100-1) and the second device (100-2). Hereinafter, the Wi-Fi Direct Network will have the same significance as a Wi-Fi P2P (Peer to Peer) network. The Wi-Fi device includes devices, such as a display device, a printer, a digital camera, a projector, a mobile phone, and so on.

Instead of using a WLAN (Wireless Local Area Network) AP (Access Point), the Wi-fi devices within the Wi-Fi Direct Network may be directly connected to one another. In order to do so, the Wi-fi device realizes a new firmware protocol.

In the example shown in FIG. 2, prior to connecting the first device (100-1) to the second device (100-2) through the Wi-Fi Direct Network, a device discovery (2001) procedure is first performed in order to allow the devices (100) to identify (or recognize) one another.

Thereafter, by sending out and receiving predetermined information to and from the device, which is discovered through the device discovery (2001), information on the service provided by the discovered device may be acquired. Accordingly, the first device (100-1) and the second device (100-2) may be capable of determining the services provided by each device in a process step prior to establishing a Wi-Fi Direct Network session.

The above-described procedure will hereinafter be described in more detail as follows.

For the device information exchange, the device discovery (2001) procedure uses a Probe Request Frame and a Probe Response Frame. The first device (100-1), which seeks to discovery whether or not another Wi-fi device exists within close range, waits (or stands by) for a probe response frame reception after transmitting a probe request frame to its surroundings. When the probe request frame is received by another second device (100-2) existing within close range, the second device (100-2) generates a probe response frame and, then, transmits the generated probe response frame back to the first device (100-1), thereby being capable of performing the device discovery (2001) procedure.

For the service information exchange of the services being provided by each device, the service discovery (2002) procedure uses a Service Discovery Request Frame and a Service Discovery Response Frame (Service Discover Response Frame). Each of the Service Discovery Request Frame and the Service Discovery Response Frame is generated by respectively using a GAS (Generic Advertisement Service) Initial Request Frame and a GAS Initial Response Frame of an IEEE 802.11u. Each field of the Service Discovery Request Frame and the Service Discovery Response Frame will be described in detail later on with reference to FIG. 5A to FIG. 5F.

After performing this Service discovery (2002) procedure, each device (100-1, 100-2) may acquire information on the services being provided by the counterpart of the service discovery (200).

Figure 3:
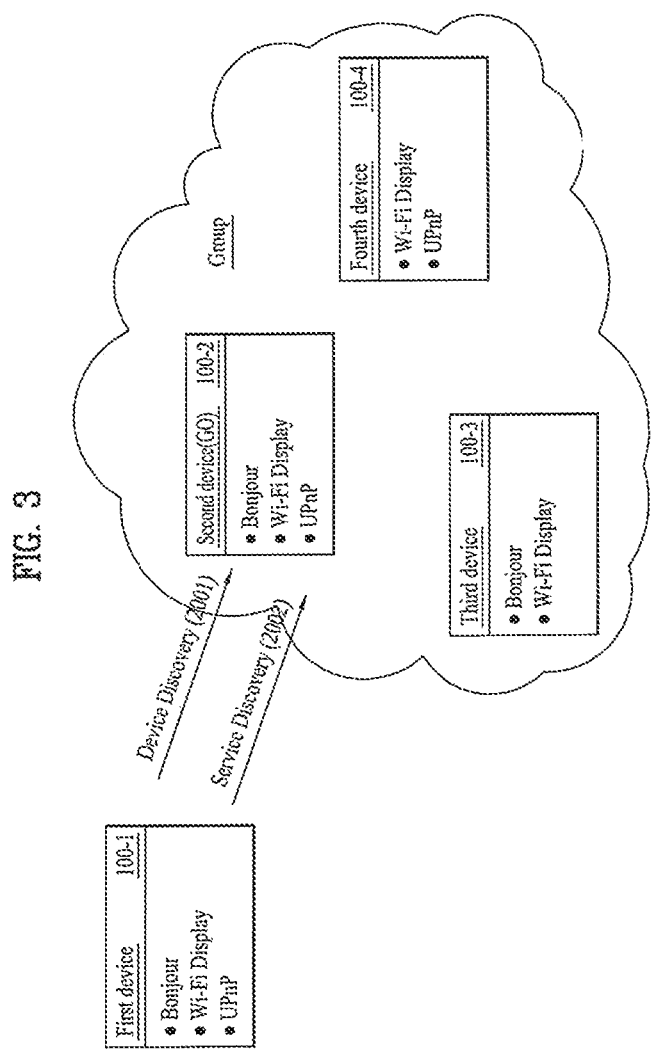
FIG. 3 illustrates an exemplary method for discovering for a service provided by a wireless communication group according to an exemplary embodiment of the present invention.

FIG. 3 illustrates an exemplary method for discovering for a service provided by a wireless communication group according to an exemplary embodiment of the present invention.

When using the Wi-Fi Direct Network, a wireless communication group may be configured between the devices connected to the network. In this case, a structure to which the network is being connected configures a wireless communication group by having one device perform the role of an Owner, and by having other plurality of devices being connected to the Owner device perform the role of Clients. And, as a characteristic of the wireless communication group configured as described above, only the Owner device can be connected to the plurality of other devices, and the Client device can only be connected to the Owner device.

Referring to the example shown in FIG. 3, in FIG. 3, the second device (100-2) performs the role of the Owner device, and a third device (100-3) and a fourth device (100-4) correspond to client devices of the second device (100-2). Therefore, a wireless communication group consisting of second to fourth devices (100-2~100-4) is configured.

In this case, when the first device (100-1) discovers for a service that is provided by this wireless communication group, the first device (100-1) first undergoes the device discovery (2001) procedure, which is described above with reference to FIG. 2, and may then be capable of performing the service discovery procedure (2002).

Such operations of the wireless communication group and the Service Discovery (2002) procedure will hereinafter be described with reference to FIG. 4.

Figure 4:
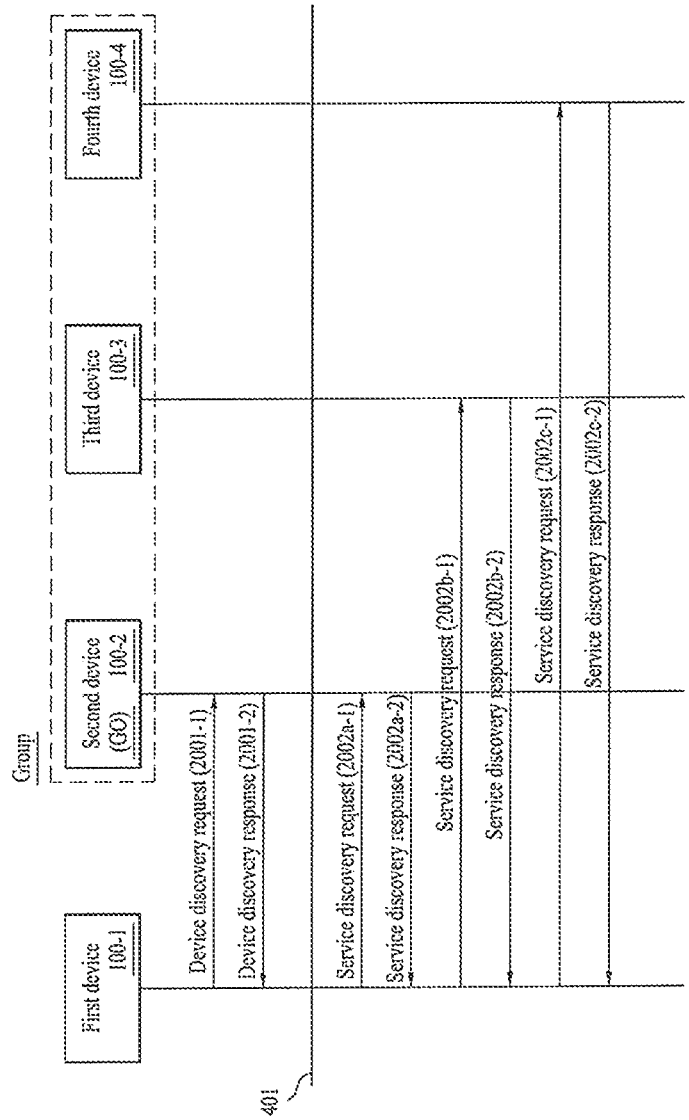
FIG. 4 illustrates a flow chart of the procedure for discovering for a service provided by a wireless communication group of FIG. 3 according to the exemplary embodiment of the present invention.

FIG. 4 illustrates a flow chart of the procedure for discovering for a service provided by a wireless communication group of FIG. 3 according to the exemplary embodiment of the present invention.

In the specification of the present invention, a service provided by the wireless communication group refers to information on the services being provided by each device (including the Owner device) belonging to the wireless communication group.

Referring to the example of FIG. 4, as shown in the example of FIG. 3, second to fourth devices (100-2~100-4) configure the wireless communication group, and, based upon a boundary line 401, the procedure corresponding to the upper portion shows the Device Discovery (2001) procedure, and the procedure corresponding to the lower portion shows the Service Discovery (2002) procedure.

The first device (100-1) performs the Device Discovery (2001) procedure with the second device (100-2), which corresponds to the Owner device. In this case, the first device (100-1) may under the Device Discovery (2001) procedure, which is described above with reference to FIG. 2, and, based upon the result of the Device Discovery (2001) procedure, device identification information of the second device (100-2), information indicating that the second device (100-2) corresponds to the Owner device, and identification information of the Client device of the respective wireless communication group may be acquired.

During the Service Discovery (2002) procedure, the first device (100-1) performs the Service Discovery (2002) procedure with each of the devices belonging to the wireless communication group. In this case, the Service Discovery (2002) procedure that is being executed is identical to the procedure described with reference to FIG. 2, and, therefore a detailed description of the same will be omitted.

More specifically, a Service Discovery procedure (2002a) is performed with the second device (100-2), which corresponds to the Owner device. Thereafter, by using the identification information of the Client device, which is acquired through the Device Discovery (2001) procedure, Service Discovery procedures (2002b, 2002c) may be performed with each of the Client devices.

In case of undergoing the Service Discovery (2002a to 2002c) procedures shown in FIG. 4, the first device (100-1) may acquire the service information provided by each of the devices (second to fourth devices) belonging to the wireless communication group.

As described above in FIG. 2, a service discovery request frame is used in a Service Discovery Request (2002-1) procedure, and a service discovery response frame is used in a Service Discovery Response (2002-2) procedure. It will be apparent that each of these frames may be equally used in the Service Discovery (2002) procedure of FIG. 4.

Hereinafter, each field of the service discovery request frame and the service discovery response frame will be described in detail with reference to FIG. 5A to FIG. 5F. Herein, the fields shown in FIG. 5A to FIG. 5F correspond to exemplary fields of the service discovery request frame and the service discovery response frame, and, therefore, it will not be required to limit the fields only to this.

FIG. 5A to FIG. 5F respectively illustrate examples of each field of a service discovery request/discovery response frame according to an exemplary embodiment of the present invention.

Each of the Service Discovery Request Frame and the Service Discovery Response Frame is generated by respectively using a GAS Initial Request Frame and a GAS Initial Response Frame of an IEEE 802.11u, and, more specifically, a vendor extension field of the GAS Initial Request/Response Frame is used.

As shown in FIG. 5A, the size of each of an "OUI (Organizationally Unique Identifier) Subtype" field of the GAS Initial Request/Response frames and a Service TLV field including Service Discovery Request/Response TLV (Type Length Value) respectively corresponds to 1 octet and a Variable Size.

The "OUI Subtype" field refers to an identifier being allocated (or assigned) to an organization, and, in the illustrated example, the "OUI Subtype" field has a value of "0X09", which identifies a WFA organization. The Service TLV varies in the case of the service discovery request frame (FIG. 5B) and in the case of the service discovery response frame (FIG. 5D).

FIG. 5B illustrates a drawing showing detailed (or segmented) fields of the Service TLV field of the Service Discovery Request Frame. As described above, as a frame being transmitted during Service Discovery Request (2002-1) procedure, the Service Discovery Request Frame performs a function of requesting for information respective to the service being supported by a device receiving the request.

In the example shown in FIG. 5B, the Service TLV field of the Service Discovery Request Frame includes "Length", "Service Protocol Type", "Service Transaction ID", and "Query data" fields, and each field has the size of 2, 1, 1, and a variable size in the respective order.

The "Length" field includes the length value of the Service Discovery Request TLV.

The "Service Protocol Type" field includes service protocol type information, and this field will be described in detail later on with reference to FIG. 5C.

The "Service Transaction ID" field includes an indicator configured to pair the Service Discovery Request Frame and the Service Discovery Response Frame. When a Service Discovery Request Frame is being configured, the "Service Transaction ID" field is set up to have an arbitrary value other than 0.

The "Query data" field includes a structure of the service discovery request frame and contents definition. The detailed segmented contents of this field may be verified in case of referring to IEEE P802.11u[4].

FIG. 5C illustrates a drawing showing an example of the "Service Protocol Type" field according to an exemplary embodiment of the present invention. Referring to FIG. 5C, the "Service Protocol Type" field includes types of service protocols being provided by the Wi-Fi device and information on whether or not an overall group service request has been made.

In the example shown in FIG. 5C, the "Service Protocol Type" field uses 8 bit, and, herein, 0~6 bit indicate service protocol type information, and the last 7 bit is used to indicate whether or not an overall group service request has been made.

The service protocol type may include any one value ranging from 0 to 127. 0 corresponds to the protocol of all services, 1 corresponds to a Bonjour protocol identifier, 2 corresponds to a UPnP protocol identifier, 3 corresponds to a Wi-Fi display protocol identifier, and 4~127 are reserved for future services.

By being included in the "Service Protocol Type" field, this service protocol type is included in the service discovery request frame. Accordingly, request may be made to the device having received the service discovery request frame for the information on whether or not the corresponding service protocol is being supported. For example, when the service discovery request frame includes "1", which corresponds to the Bonjour protocol indicator, this service discovery request frame requests for "information on whether or not the receiving device supports the Bonjour protocol". As another example, when the service discovery request frame includes "0", which corresponds to the protocol indicator of all services, this service discovery request frame requests for "information on all services supported by the receiving device".

As a field associated with another exemplary embodiment of the present invention, the information whether or not an overall group service request has been made, which corresponds to the last 7 bit, will be described later on along with the exemplary embodiment of FIG. 6.

FIG. 5D illustrates a drawing showing an example of segmented fields of the service TLV field of a service discovery response frame.

In the example shown in FIG. 5D, the Service TLV field of the Service Discovery Request Frame includes "Length", "Service Protocol Type", "Service Transaction ID", "Status Code", and "Response data" fields, and each field has the size of 2, 1, 1, 1, and a variable size in the respective order.

Since "Length", "Service Protocol Type", and "Service Transaction ID" are identical to the respective fields of the service TLV of the service discovery request frame, which is described above with reference to FIG. 5D, detailed description of the same will be omitted.

The "Status Code" field corresponds to a field including status information respective to a service, which is requested by the service discovery request frame, and, since this field uses 8bits (1octect), the value of this field may range from 0~255. With respect to the "Status Code" field, referring to FIG. 5E, in case the value of the "Status Code" field is equal to 0 (0X00), this indicates that the usage of the request service protocol is available, and, in case the field value equal to 1 (0X01), this indicates that the usage of the request service protocol is unavailable. Additionally, in case the field value equal to 2 (0X10), this indicates that the requested information cannot be provided, and in case the field value equal to 3 (0X11), this indicates an error message indicating that the received request corresponds to a wrong (or incorrect) request. Furthermore, in case the field value is equal to 4~255, the respective significance is not yet defined.

The "Response Data" field may vary in accordance with the service information type, which is included in the "Service Protocol Type" field and the "Query Data Field" field. More specifically, the "Response Data" field includes service information type requested by the received Service Discovery request frame and the related service data. For example, when information on whether or not the "Bonjour" protocol is supported is received by the received service discovery request frame, the "Response Data" field may also include detailed protocol information, such as version information of the supported protocol even in the "Bonjour" protocol and/or detailed service information of the "Bonjour" protocol. More specifically, the detailed contents being included in the "Bonjour" protocol is defined by the "Bonjour" protocol itself, and the Wi-Fi Direct defines only the protocol for transmitting/receiving such information.

Meanwhile, the "Response Data" field according to yet another exemplary embodiment of the present invention will be described later on along with the description of FIG. 7. Additionally, as a drawing showing a "P2P group capability bitmap" field according to the exemplary embodiment of the present invention, FIG. 5F will be described later on with reference to FIG. 7.

According to the Service Discovery (2002) procedure, which is described above with reference to FIG. 3 to FIG. 5F, in order to acquire service support information of each device included in the group, it is inevitable for the first device (100-1), which seeks to perform the Service Discovery, to undergo the Service Discovery (2002) procedure with each device belonging to the group. In case the Service Discovery (2002) procedure is performed with each device belonging to the group, as described above, there may be concern about waste of data resources as well as waste of power. Most particularly, considering the characteristics of the Wi-Fi Direct device, most of the devices are related to mobile user equipments, and, with respect to such mobile user equipments waste of power is one of the most crucial issues.

Therefore, in the exemplary embodiments of the present invention that will hereinafter be described in detail, a method of collectively determining (or identifying) the supported services of each device belonging to a group by requesting for Service Discovery with respect to the entire group. And, such exemplary embodiment will hereinafter be described with reference to FIG. 6 to FIG. 11A.

FIG. 6 illustrates an exemplary method of collectively identifying a supporting service of each device belonging to the group according to another exemplary embodiment of the present invention. As illustrated in the example shown in FIG. 4, the example shown in FIG. 6 corresponds to a state when a wireless communication group consisting of a second device, which corresponds to the Owner device, and third and fourth devices, which correspond to the Client devices, is configured.

According to the exemplary embodiment of the present invention, the Owner device of the wireless communication group acquires supported services of each Client device belonging to the wireless communication group and stores the acquired supported services (6001 procedure).

Through the Device Discovery (2001) procedure, the first device (100-1) identifies the second device (100-2), which corresponds to the Owner device. During the Device Discovery (2001) procedure, the second device (100-2), which corresponds to the group owner device, provides a "P2P group capability bitmap", which corresponds to information indicating the nature (or attribute) of the respective group, to the first device (100-1). Since details on the "P2P group capability bitmap" are identical to the general Wi-Fi Direct network, detailed description of the same will be omitted for the clarity of the present invention.

Thereafter, a Group Service Discovery (6001) procedure is performed on the second device (100-2). As a procedure according to the exemplary embodiment of the present invention, the Group Service Discovery (6001) procedure corresponds to an evolved service discovery procedure that can collectively identify (or determine) the supported service of each device belonging to the group.

The first device (100-1) should be capable of identifying whether or not the group, to which the second device (100-2) belongs, supports the Group Service Discovery (6001) procedure. Therefore, it is proposed in the exemplary embodiment of the present invention to include information on whether or not the Group Service Discovery (6001) procedure is being supported in the above-described "P2P group capability bitmap". Therefore, it is proposed in the present invention to correct (or amend) the conventional "P2P group capability bitmap" field as described below with reference to FIG. 5F.

Referring back to FIG. 5F, FIG. 5F illustrates a drawing of the "P2P group capability bitmap", which is corrected according to the exemplary embodiment of the present invention. Since 0~6 bit of the "P2P group capability bitmap" are the same as the conventionally used "P2P group capability bitmap", detailed description of the same will be omitted.

Referring to 7 bit, which corresponds to the last bit, a "Service Broadcast" bit, which indicates whether or not the Group Service Discovery function according to the exemplary embodiment of the present invention is being supported, is illustrated.

When the value of the "Service Broadcast" bit is equal to "0", this indicates that the Group Service Discovery function of the present invention is being supported, and when the value of the "Service Broadcast" bit is equal to "1", this indicates that the Group Service Discovery function of the present invention is not being supported.

The "P2P group capability bitmap", which is configured as described above, may be used in beacon transmission, discovery response, (re-)grouping response, and so on, thereby indicating that the Group Service Discovery function is being supported.

As described above, in the Device Discovery (2001) procedure, the first device (100-1), which seeks to perform service discovery, may determine whether or not the Group Service Discovery (6001) is being supported through the "P2P group capability bitmap" of a discovery target group. Accordingly, the first device (100-1) may transmit a Group Service Discovery request (6001-1) to the second device (100-2).

When the first device (100-1) undergoes the Group Service Discovery (6001) procedure with the second device (100-2), which corresponds to the Owner device, the first device (100-1) may acquire services supported by each device belonging to the corresponding group.

The service discovery request/response frames that are used in the above-described exemplary embodiments may be corrected in the frames, which are described above with reference to FIG. 5A to FIG. 5F. Such correction will be described in detail later on with reference to FIG. 5A to FIG. 5F and FIG. 7A to FIG. 7C.

In case of the group service discovery request frame, the frame is needed to be differentiated from a general service discovery request frame. Therefore, it is proposed in the exemplary embodiment of the present invention to identify this by using the "Service Protocol Type" field of the service discovery request frame.

In the example shown in FIG. 5C, depending upon the value of the last bit 7bit of the "Service Protocol Type" field, the service discovery request frame may be identified as a group service discovery request frame or a general service discovery request frame.

More specifically, in case the value of the last bit of the "Service Protocol Type" field is equal to "0", the second device (100-2) may identify the received frame as a general service discovery request frame. Therefore, when receiving this frame, the second device (100-2) generates a general service discovery response frame with respect to the received general service discovery request frame. As described above with reference to FIG. 5A to FIG. 5F, this general service discovery response frame includes only the information on the service provided by the second device (100-2).

Conversely, in case the value of the last bit of the "Service Protocol Type" field is equal to "1", the second device (100-2) may identify the received frame as a group service discovery request frame according to an exemplary embodiment of the present invention. Therefore, when receiving this frame, the second device (100-2) generates a group service discovery response frame with respect to the received group service discovery request frame. This group service discovery response frame includes information on all of the services provided by each device belonging to the wireless communication group.

Hereinafter, the field structure of the group service discovery response frame according to an exemplary embodiment of the present invention will hereinafter be described with reference to FIG. 7A to FIG. 7C.

Figures 7A, 7B:
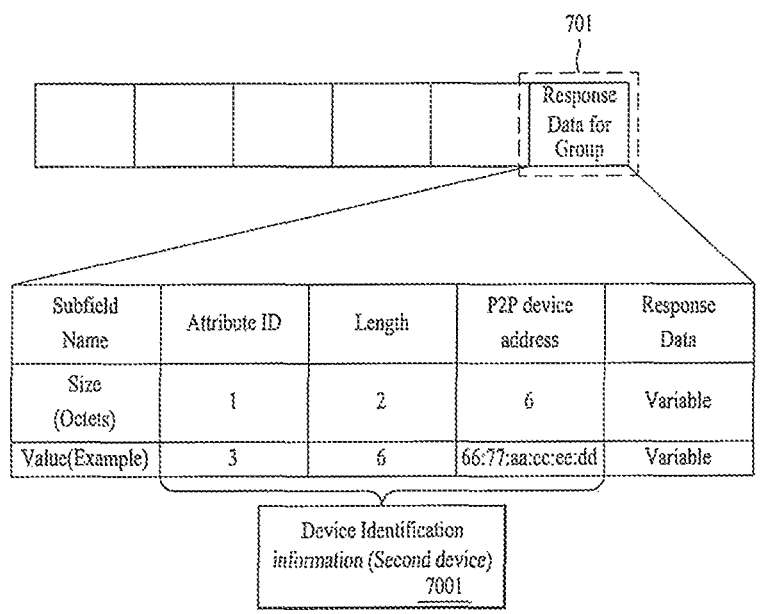
FIG. 7A to FIG. 7C illustrate an exemplary field structure of a group service discovery response frame according to an exemplary embodiment of the present invention.
Figure 7C:
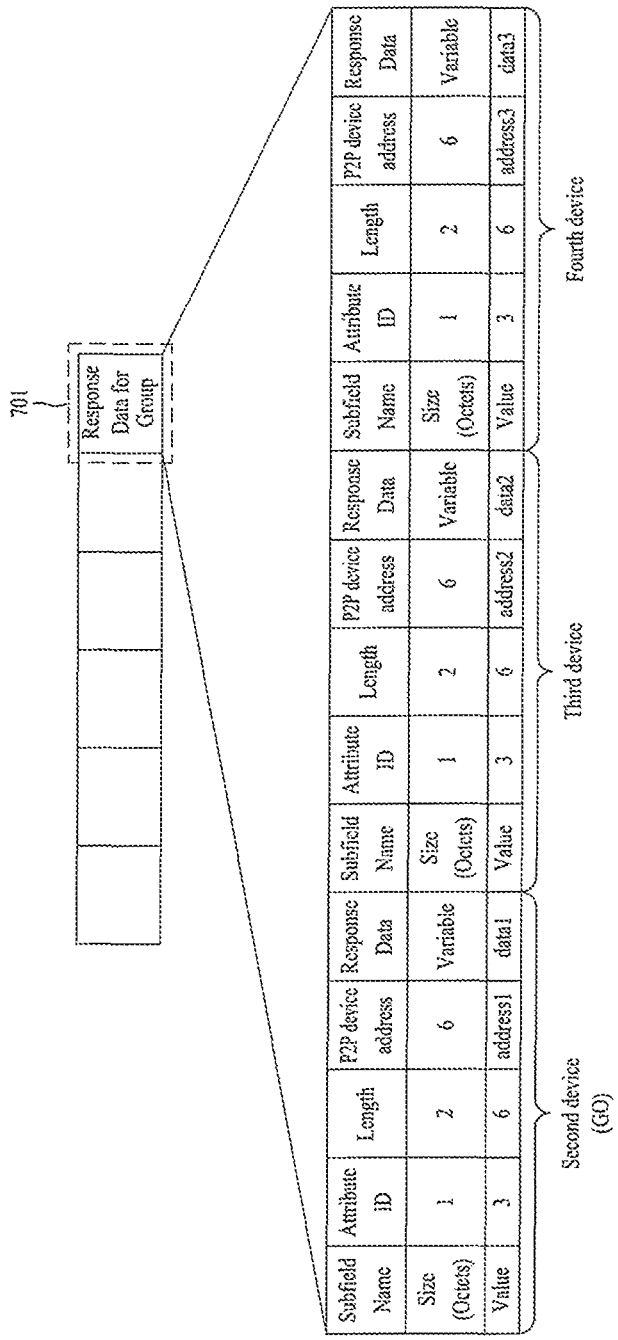

FIG. 7A to FIG. 7C illustrate an exemplary field structure of a group service discovery response frame according to an exemplary embodiment of the present invention. The basic structure of the group service discovery response frame is similar to the structure of the general service discovery response frame, and, in FIG. 7A to FIG. 7C, the description will be mainly focused on the difference between the group service discovery response frame and the general service discovery response frame. Most particularly, an example of the basic structure, which is to be described with reference to FIG. 7A to FIG. 7C is identical to the basic structure of the service discovery frame, which is shown in FIG. 5A.

FIG. 7A illustrates an example of a segmented field of the "Service TLV" field of the group service response frame. The segmented field of the "Service TLV" field shown in FIG. 7A include "Length", "Service Protocol Type", "Service Transaction ID", "Status Code", and "Response data" fields, and each field has the size of 2, 1, 1, 1, and a variable size in the respective order.

Since the detailed description of the "Length", "Service Protocol Type", "Service Transaction ID", and "Status Code" fields is identical to the description of the segmented field shown in FIG. 5D, detailed description of the same will be omitted.

Hereinafter, a "Response Data for Group" field (701), which corresponds to the segmented field of the group service discovery response frame, will be described.

It is proposed in the exemplary embodiment of the present invention that the group supported service is included in the "Response Data for Group" field (701). More specifically, it is proposed that the supported services of each device belonging to the group are collectively included in the "Response Data for Group" field (701). Such detailed example will hereinafter be described in detail with reference to FIGS. 7B and 7C.

FIG. 7B illustrates an example of the "Response Data for Group" field (701) according to an exemplary embodiment of the present invention. In FIG. 7B, an exemplary case, wherein supported service information of a single device is included in the "Response Data for Group" field (701), is described.

Since the "Response Data for Group" field (701) collectively handles information on multiple devices, information identifying devices (or device identification information) (7001) is respectively paired with supported service information (Response Data) of the corresponding device and then stored.

The example shown in FIG. 7B includes identification information (7001) respective to the second device. The device identification information (7001) may be segmented to "Attribute ID", "Length", and "P2P device address" fields.

The "Attribute ID" field is identical to the field that is generally used in the Wi-Fi Direct network and includes attribute information of the P2P network.

The "Length" field includes length information of subfields respective to each device.

The "P2P device address" field includes a Hardware address of the corresponding device. In the example shown in FIG. 7B, the "P2P device address" field is filled with the hardware address of the second device (100-2).

The "Response Data" field is identical to the same field described in FIG. 5D. More specifically, the "Response Data" field may vary in accordance with the service information type, which is included in the "Service Protocol Type" field and the "Query Data Field" field. Additionally, the "Response Data" field includes service information type requested by the received Service Discovery request frame and the related service data.

In the example shown in FIG. 7B, the "Response Data for Group" field (701) includes only the service supported by one device. However, in the exemplary embodiments of the present invention, services supported by multiple devices may be included in the "Response Data for Group" field (701). The structure of a segmented field in a case when supported services of multiple devices are collectively included in the "Response Data for Group" field (701) will be described with reference to FIG. 7C.

FIG. 7C illustrates a segmented field structure including the supported service of multiple devices in the "Response Data for Group" field (701). In the example shown in FIG. 7C, the second device (100-2), which corresponds to the Owner device, indicates a service discovery response frame, which is generated with respect to a case when a request for information on whether or not a "UPnP" protocol service is being supported is received.

The "Response Data for Group" field (701) includes the supported devices respective to three devices (second to fourth devices). In this case, in the exemplary embodiment of the present invention, the "Response Data for Group" field (701) may configure the overall "Response Data for Group" field (701) by directly connecting segmented fields respective to each device, wherein the segmented fields are described above in FIG. 7B.

More specifically, the segmented fields respective to each device respectively include information identifying devices (or device identification information) (7001) and supported service information (Response Data) of the corresponding device.

When determined based upon the information included in the "Response Data for Group" field (701), the group service discovery response frame shown in FIG. 7C supports the "UPnP" service protocol of all of the second to fourth devices (100-2~100-4), and version of the "UPnP" service protocol and/or detailed service contents may be additionally determined through each "Response Data" field.

As described above, in case of performing the group service discovery (6001) procedure according to an exemplary embodiment of the present invention, supported services of each of the devices belonging to the wireless communication group may be collectively identified.

Meanwhile, in case of some of the services, the usage may be temporarily unavailable. For example, in case of a Wi-Fi display service, with the exception for a 1:1 connection, additional connection cannot be established. Therefore, when a specific device within the wireless communication group is performing communication by using the Wi-Fi display service, when additional Wi-Fi display connection is attempted to be established with this device, the attempted connection is denied.

Therefore, in another exemplary embodiment of the present invention, it is proposed to differentiate the service that is currently available for usage from the service that is currently unavailable for usage during the general/group service discovery (2002, 6001) procedure and, then, to provide the available service. This exemplary embodiment will hereinafter be described in detail with reference to FIG. 8 and FIG. 9.

Figure 8:
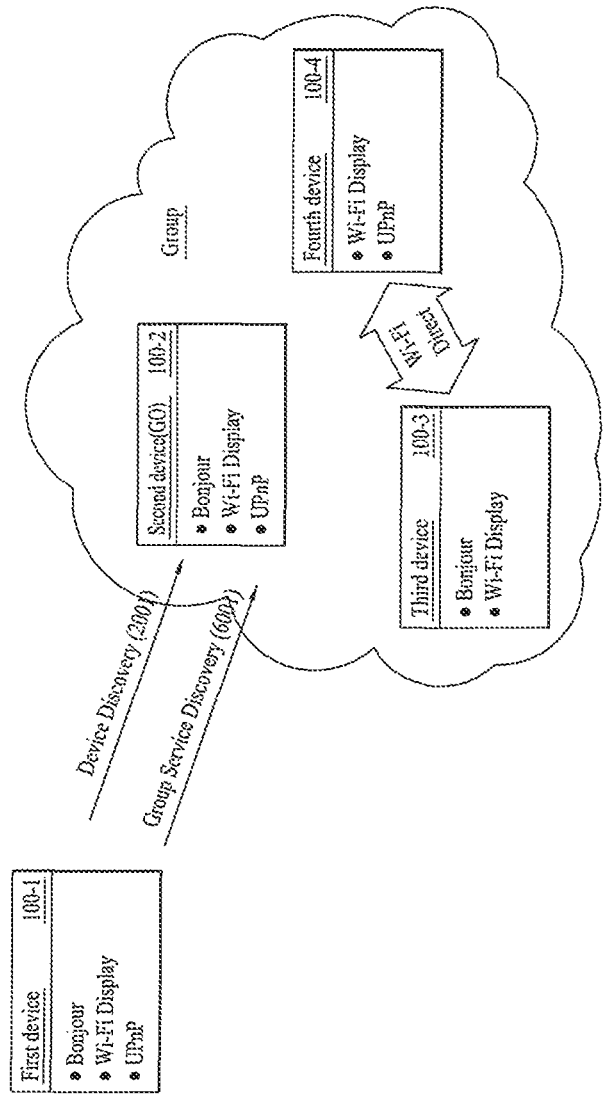
FIG. 8 illustrates an example for describing a group service discovery procedure according to another exemplary embodiment of the present invention.

FIG. 8 illustrates an example for describing a group service discovery procedure according to another exemplary embodiment of the present invention. In the example shown in FIG. 8, just as shown in FIG. 3, a wireless communication group is configured, wherein the second device (100-2) is the owner device.

Also, as an additional example, a third device (100-3) and a fourth device (100-4) establish a session by each using a Wi-Fi display protocol.

In the above-described state, when the first device (100-1) requests for a Group Service Discovery (6001), the second device (100-2), which corresponds to the Owner device, responds to the first device (100-1) not only by including the supported services of each device belonging to the current group, but also by further including information on which service is currently available for usage among the supported services.

In order to further include information on which service is currently available for usage among the supported services, it is proposed in the exemplary embodiment of the present invention to use the "Status Code" field within the Service TLV of the Group Service Discovery response frame shown in FIG. 7A.

FIG. 9 illustrates an example of including information on current availability or unavailability in a "Status Code" field within a service TLV of a group service discovery response frame according to an exemplary embodiment of the present invention. A value that is common to the "Status Code" field shown in FIG. 5E exists in the "Status Code" field shown in FIG. 9. More specifically, in case the value of the "Status Code" field is within the range of 0~3, it is identical to what is shown in FIG. 5E, and, therefore, detailed description of the same will be omitted.

In case the "Status Code" field value is equal to "4", the group service discovery response frame includes information indicating that the corresponding service protocol is currently available for usage. In case the "Status Code" field value is equal to "5", the group service discovery response frame includes information indicating that the corresponding service protocol is currently not available (or unavailable) for usage. And, in case the "Status Code" field value is equal to "6", the group service discovery response frame includes information indicating that it is unclear as to whether or not the corresponding service protocol is currently available for usage.

As described above, the exemplary embodiment of the present invention not only provides supported service of each device belonging to the wireless communication group but also include information on whether or not the corresponding supported service is currently available for usage.

Furthermore, it is proposed in yet another exemplary embodiment of the present invention that, after the supported services of each device belonging to the wireless communication group are provided, when a change occurs in a corresponding supported service, information that can update such change is further provided. Detailed description of the same will be provided later on with reference to FIG. 10 and FIG. 11A.

Figure 10:
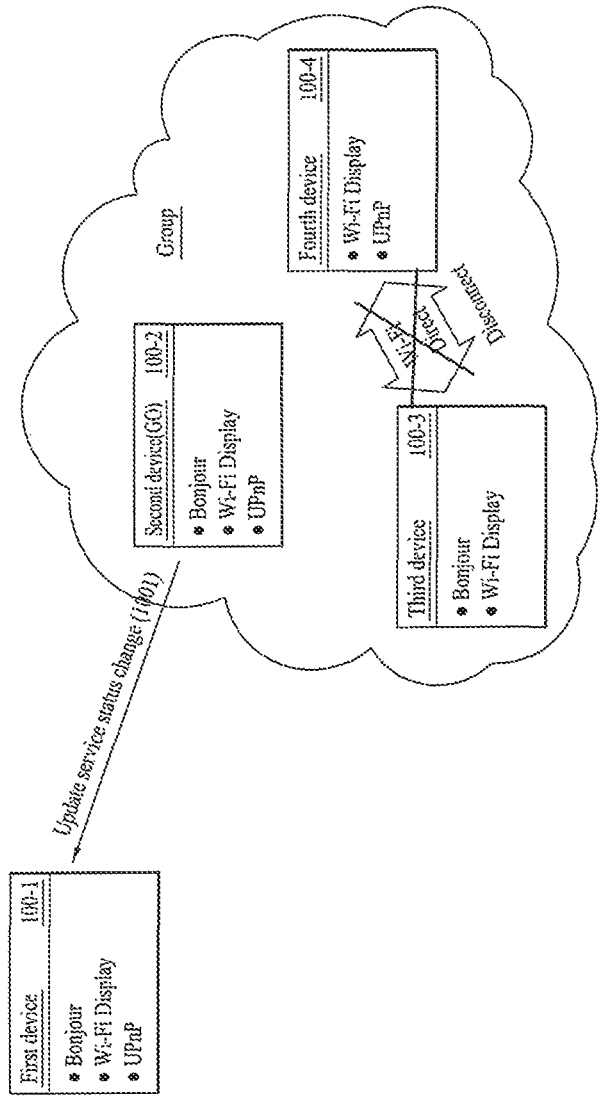
FIG. 10 illustrates an example of a method for providing information that can update a supporting service, when a change occurs in the supporting service according to yet another embodiment of the present invention.

FIG. 10 illustrates an example of a method for providing information that can update a supporting service, when a change occurs in the supporting service according to yet another embodiment of the present invention. In the example shown in FIG. 10, just as shown in FIG. 3, a wireless communication group is configured, wherein the second device (100-2) is the owner device.

Additionally, in the example shown in FIG. 10, the second device (100-2) is in a state of having provided the supported services of each device belonging to the wireless communication group and the information on whether or not the corresponding supported service is currently available for usage. Since the time point at which the provision takes place corresponds to a state when the third device (100-3) and the fourth device (100-4) have established a session by using the Wi-Fi Display protocol, information indicating that the usage of the Wi-Fi Display protocol of the third device (100-3) and the fourth device (100-4) is currently available for usage, is included in the information provided to the first device (100-1) by the second device (100-2).

Thereafter, when the Wi-Fi display connection of the third device (100-3) and the fourth device (100-4) is cancelled (or disconnected), the Wi-Fi display service respective to the third device (100-3) and/or the fourth device (100-4) shifts to a state that is available for usage. Therefore, it is proposed in the exemplary embodiment of the present invention, that, in order to update the change (or shift) in the usage availability status of the service, as described above, the service discovery response frame should be periodically transmitted towards the first device (100-1), and that information enabling such update to be identified should be included in the service discovery response frame and then transmitted.

A detailed structure of a frame including the information that can identify the update will hereinafter be described in detail with reference to FIG. 11A.

FIG. 11A illustrates an example of a "Status Code" field included in a Service discovery response frame according to yet another embodiment of the present invention.

Referring to FIG. 11A, in the exemplary embodiment of the present invention, the 8 bits configuring the "Status Code" field may be divided into two sections. 0~6 bits include the information that is conventionally used, and 7 bit corresponding to the last bit indicates that the supported service information and/or information on the currently available service has/have been updated according to the exemplary embodiment of the present invention.

More specifically, in case the last bit 7Bit of the "Status Code" field is equal to "0", the first device (100-1) may determine that the supported service information and/or information on the currently available service has/have been updated. Accordingly, the first device (100-1) may analyze the remaining service discovery response frame, so as to be capable of identifying the updated information.

Conversely, in case the last bit 7Bit of the "Status Code" field is equal to "1", the first device (100-1) may determine that the supported service information and/or information on the currently available service has/have not been changed. Accordingly, the first device (100-1) may continue to use the conventional supported service information and/or information on the currently available service without modification.

In the above-described exemplary embodiment of the present invention, it has been proposed that, in order to update the change (or shift) in the usage availability status of the service, the service discovery response frame should be periodically transmitted towards the first device (100-1). Meanwhile, in another exemplary embodiment of the present invention, it is proposed that a Service Update Notification Frame should be newly defined and that the Service Update Notification Frame should be periodically transmitted. The Service Update Notification Frame will hereinafter be described in detail with reference to FIG. 11B and FIG. 11C.

FIG. 11B illustrates an example of a service update notification frame according to an exemplary embodiment of the present invention. The basic structure of the Service Update Notification Frame follows the basic structure of the "P2P public action" field, and the "OUI Subtype" that is defined herein is designated as 9 for "service discovery".

In this case, the "Update data" field corresponds to a field including information on an update status that is to be used in the exemplary embodiment of the present invention, and this field will be described in detail with reference to the segmented field shown in FIG. 11C.

FIG. 11C illustrates a detailed field configuration of an "Update data" field according to an exemplary embodiment of the present invention. The "Update data" field may include subfields of "Service Update Indicator", "Length", "Service Protocol Type", "Service Transaction ID", "Status Code", and "Update data".

As data having the size of 2 octets, the "Service Update Indicator" field corresponds to information that can identify whether or not an update has occurred by being incremented by 1 each time an update occurs.

The "Length" field may include information on the total length of the "Update data" field.

The "Service Protocol Type" field is determined (or set up) with respect to a service protocol type that is available for support and defined in the P2P.

The "Service Transaction ID" field includes an identifier for pairing a service discovery request frame and a service discovery response frame. When a service discovery request frame is generated, the "Service Transaction ID" field is assigned with an arbitrary value other than 0.

The "Status Code" field is identical to the same field, which has been described above with reference to FIG. 11A, and, when the service support availability status is updated, the "Status Code" field includes information indicating the corresponding update in the last 7 Bit.

More specifically, in case the availability status of the service is changed by periodically transmitting the newly defined service update notification frame to another device, which is described above with reference to FIG. 11B and FIG. 11C, it is proposed that the changed status can be updated to the other device.

Meanwhile, in the exemplary embodiments of the present invention, different roles (or functions) may be performed in accordance with the Owner device and the Client devices. Most particularly, in the exemplary embodiments of the present invention that will hereinafter be described, an example of supporting a USB (Universal Serial Bus) service protocol by using a Wi-Fi direct network will be described.

Therefore, in the exemplary embodiments of the present invention, when a wireless communication group is configured, and, most particularly, when the USB service protocol is used, a method of deciding the Owner device and Client devices that are formed herein is proposed.

FIG. 12 illustrates a drawing for describing a method for deciding owner/client devices, when forming a wireless communication group according to yet another embodiment of the present invention. The wireless communication group that is configured herein supports the USB service by using the Wi-Fi direct network, and the devices that are connected as described above will hereinafter be referred to as Wi-Fi USB (WSB).

As a characteristic of the USB service protocol, two devices establishing connection are respectively identified as a Host device (WSB host) and a Dock device (WSB dock). By controlling the host device and the dock device, reading and/or writing operations may be performed on data included in the dock device or the dock device may be controlled.

Referring to FIG. 12(a), when being connected by a USB service protocol, a Lap top (1201) may perform the function of a host device and may also perform the function of a dock device. This is because, in case of the laptop (1201), since other connected devices can be controlled and since data can be read and written by using a CPU (Central Processing Unit), which can control other devices, and other peripheral devices, the laptop (1201) may perform the function of a host device. Moreover, since the laptop (1201) also includes a memory, the laptop (1201) may also perform the function of a dock device.

Meanwhile, in case of a WSB dock (1202) shown in FIG. 12(a), when it is assumed that there is no controller, which can control other devices, the WSB dock (1202) cannot perform the function of a host device. Therefore, in this case, the WSB dock (1202) may only perform the function of a dock device.

Therefore, in FIG. 12(a), when the laptop (1201) and the WSB dock (1202) used the USB service protocol by using the Wi-Fi Direct network, the laptop (1201) performs the function of the host device, and the WSB dock performs the function of the dock device.

In this case, there may be a problem in whether the Owner device within the Wi-Fi Direct network is to be decided as the host device (laptop) or decided as the dock device (WSB dock).

Further referring to FIG. 12(b), the laptop (1201) is connected to a digital camera (1203) through the Wi-Fi Direct network and provides a USB service protocol. In case of the digital camera (1203), since the digital camera (1203) does not generally control other devices that are connected, the laptop (1201) may perform the function of the host device.

In case of FIGS. 12(a) and (b), the laptop (1201) generally performs the function of an Owner device. This is because, since the owner device can connect a plurality of client devices, most of the owner devices correspond to devices having high data processing capabilities. Furthermore, since the owner device should establish multiple connections, devices providing smoother power supply may function as the owner device.

Therefore, in the exemplary embodiment of the present invention that will hereinafter be described, a method of efficiently assigning owner or client functions of a host device and dock devices is proposed.

FIG. 13 illustrates a schematic example of a method for pairing host/dock devices of a USB service protocol with owner/client devices within a Wi-fi Direct network.

Figure 14:
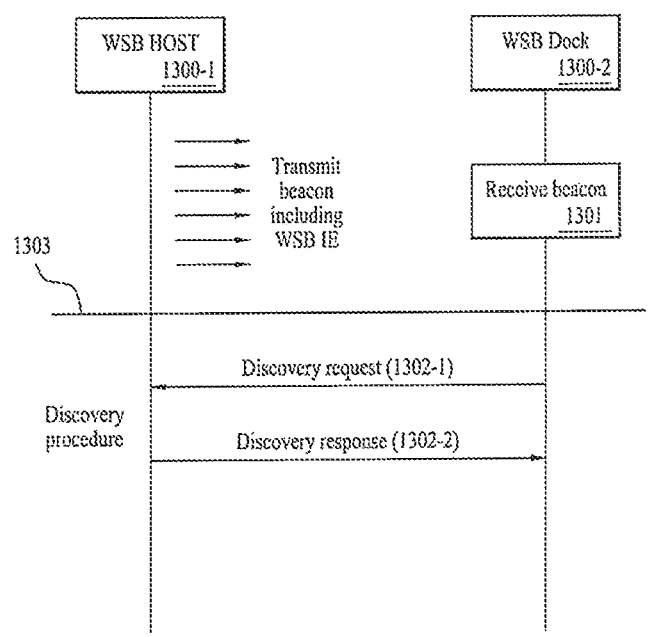
FIG. 14 illustrates a flow chart showing a method for setting up owner/client devices, when among two device providing the USB service protocol, one device supports only the host device, and when the other device supports only the dock device.

Referring to FIG. 13(a), among the two devices using the USB service protocol, in case one corresponds to a device supporting only the host device, and in case the other corresponds to a device supporting only the dock device, a method of respectively pairing the corresponding devices to owner/client devices is described herein. In this case, in the exemplary embodiment of the present invention, it is proposed to set up the host device as the owner device and to set up the dock device as the client device. This is because, since the owner device can establish a Wi-Fi Direct network connection with multiple devices, as described above, it will be more advantageous for the host device to perform such function. Referring to FIG. 14, the procedure for setting up the owner device of the group in the example shown in FIG. 13(a) will be described.

FIG. 14 illustrates a flow chart showing a method for setting up owner/client devices, when among two device providing the USB service protocol, one device supports only the host device, and when the other device supports only the dock device.

As described above, when a device supporting only the host device and a device supporting only the dock device are connected, if the two devices are capable of exchanging attribute information respective to whether or not the support can be provided, the owner device may be easily decided. Therefore, in the exemplary embodiments of the present invention, when a Wi-Fi Direct network is being established, it is proposed to exchange attribute information respective to whether or not support can be provided. This attribute information will hereinafter be referred to as WSB IE (Wi-Fi USB Information Elements).

Referring to FIG. 14, based upon line 1303, the upper portion correspond to a beacon transmission section, and the lower portion correspond to a device discovery (or discovery) procedure. In the beacon transmission section, a device attempting to establish connection transmits a beacon signal to another device and waits for a response to the transmitted beacon signal. In the exemplary embodiment of the present invention, it is proposed to transmit the beacon signal by including a WSB IE in the beacon signal. More specifically, since the beacon signal of the example shown in FIG. 14 corresponds to a beacon signal being transmitted by a host device (1300-1), the WSB IE being included in this beacon signal may include information indicating that the device performing transmission only supports the host device.

In the beacon transmission section, the dock device (1300-2) receives a beacon signal. After receiving the beacon signal, the dock device (1300-2) may acquire information indicating that the device (1300-1), which has transmitted the beacon signal, only supports the host device through the WSB IE included in the beacon signal.

After receiving the beacon signal, the dock device responds to the beacon signal during the device discovery (or discovery) procedure and transmits a discovery (or discovery) request (1302-1) including the WSB IE to the host device (1300-1). The WSB IE, which is included in the discovery request (1302-1), includes information indicating that the dock device itself can support only the dock device.

In the above-described exemplary embodiment, by exchanging the WSB IE to and from one another, the two devices intending to establish the Wi-Fi Direct network may acquire information that can be supported by each of the respective counterpart. Therefore, by using the information that has been acquired as described above, owner/client of the wireless communication group may be set up (or determined).

Meanwhile, in the above-described exemplary embodiment, although a case of including a WSB IE when performing beacon transmission is given as an example, according to another exemplary embodiment, during the discovery procedure, each WSB IE may be exchanged by using the discovery request (1302-1) and the discovery response (1302-2).

Referring back to FIG. 13, in case of FIG. 13(b), the drawing shows a case when both of the two devices using the USB service protocol support both the host device and the dock device. And, in this case, in the exemplary embodiment of the present invention, a method of acquiring WSB IE, which corresponds to the attribute information respective to each of the two devices, and setting up each of the devices as the owner device or the client device in accordance with the attribute information is proposed. The WSB IE, which is the attribute information, will hereinafter be described with reference to FIG. 15A to FIG. 15D.

FIG. 15A illustrates each field of WSB IE (Wi-Fi USB Information Elements) according to an exemplary embodiment of the present invention.

WSB IE may include "Elements ID", "Length", "OUI", "OUI Type", and "WSB Subelements", and each field in the example shown in FIG. 15a has the size of 1, 1, 3, 1, and a variable size in the respective order.

Since the "Elements ID", "Length", "OUI", and "OUI Type" fields are identical fields in the general P2P Information Elements defined in IEEE 802.11, detailed description of the same will be omitted.

The "WSB Subelements" field corresponds to a field including attribute information of the WSB connection according to an exemplary embodiment of the present invention, a segmented field structure will be described through FIG. 15b.

FIG. 15B illustrates an example of detailed segmented fields of a "WSB Subelements" field according to an exemplary embodiment of the present invention. The segmented field of the "WSB Subelements" field may include "Subelement ID", "Length", and "Subelements body field".

The "Subelement ID" field refers to a field designated to identify the format of the "WSB Subelements" field.

The "Length" field includes information on the total length of the "Subelement ID" field.

The "Subelements body field" corresponds to a field including attribute information of the WSB connection according to an exemplary embodiment of the present invention, a segmented field structure will be described through FIG. 15C.

FIG. 15C illustrates an example of segmented fields of a "Subelements body field".

The "Subelement ID" field refers to a field designated to identify the format of the "WSB Subelements" field.

The "Length" field includes information on the total length of the "Subelement body field" field.

The "WSB Device Information" uses 8bits and indicates the attribute information of the WSB connection. The detailed bit structure will be described with reference to FIG. 15D.

FIG. 15D illustrates an exemplary bit structure of "WSB Device Information" according to an exemplary embodiment of the present invention. "WSB Device Information" uses 8 bit, and, among the 8 bits, 0~1 bit is defined for the attribute information of the device, 2~3 bit is defined for intended operation (or preferred operation) information of the device, 4~5 bit is defined for WSB pairing support information, 6 bit is defined for WSB service discovery support information, and 7~8 bit is reserved without being defined.

The 0~1 bit indicating the attribute information of the device may be assigned with values 0~3, and in case the value of the attribute information of the device is equal to "0", this indicates that the WSB device supports only the host device. In case the value of the attribute information of the device is equal to "1", this indicates that the WSB device supports only the dock device. In case the value of the attribute information of the device is equal to "2", this indicates that the WSB device is capable of supporting both the host device and the dock device. The 2~3 bit indicating the intended operation information of the device may be assigned with values 0~3, and in case the value of the intended operation information is equal to "0", this indicates that the WSB device wishes to be operated as the host device. In case the value of the intended operation information is equal to "1", this indicates that the WSB device wishes to be operated as the dock device. In case the value of the intended operation information is equal to "2", this indicates that it is irrelevant as to whether the WSB device operates as any one of the host device and the dock device. Such intended operation may vary depending upon the supplied amount of power. More specifically, in a situation where power supply is performed smoothly (e.g., in case power supply is performed smoothly due to a connection to a power socket), there may be no concern regarding power supply even if the WSB device operates as the host device. However, in case the power supply is not performed smoothly (e.g., in case of a mobile terminal (or user equipment), and, most particularly, in case the remaining amount of power is low), the device may prefer to be operated as the dock device. Therefore, in the exemplary embodiment of the present invention, by changing such intended operation information, the WSB device may be adequately decided as the owner device or the client device.

The 4~5 bit indicating the WSB pairing support information may be assigned with values 0~3, and in case the value of the WSB pairing support information is equal to "0", this indicates that the WSB pairing function is currently not supported. In case the value of the WSB pairing support information is equal to "1", this indicates that the WSB pairing function is currently being supported. The 6 bit indicating the WSB service discovery support information may be assigned with values 0~3. As described in the exemplary embodiment of the present invention, the WSB service discovery support information refers to information indicating whether the owner/client device can be decided in the wireless communication group by exchanging WSB IE information.

In case the value of the WSB service discovery support information is equal to "0", this indicates that the WSB service discovery is not being supported. And, in case the value of the WSB service discovery support information is equal to "1", this indicates that the WSB service discovery is being supported.

FIG. 15D shows detailed information being included in the "WSB Device Information". Among the information included in the "WSB Device Information", in case attribute information of the device is being used, whether the corresponding device supports only the host device, or whether the corresponding device supports only the dock device, or whether the corresponding device supports both the host device and the dock device may be verified. Furthermore, whether operation as the host device is intended (or preferred), or whether operation as the dock device is intended may also be known. Hereinafter, in FIG. 16 and FIG. 17, examples of setting up the host device and the dock device as the owner/client devices by using the above-described information will be described in detail.

Figure 16:
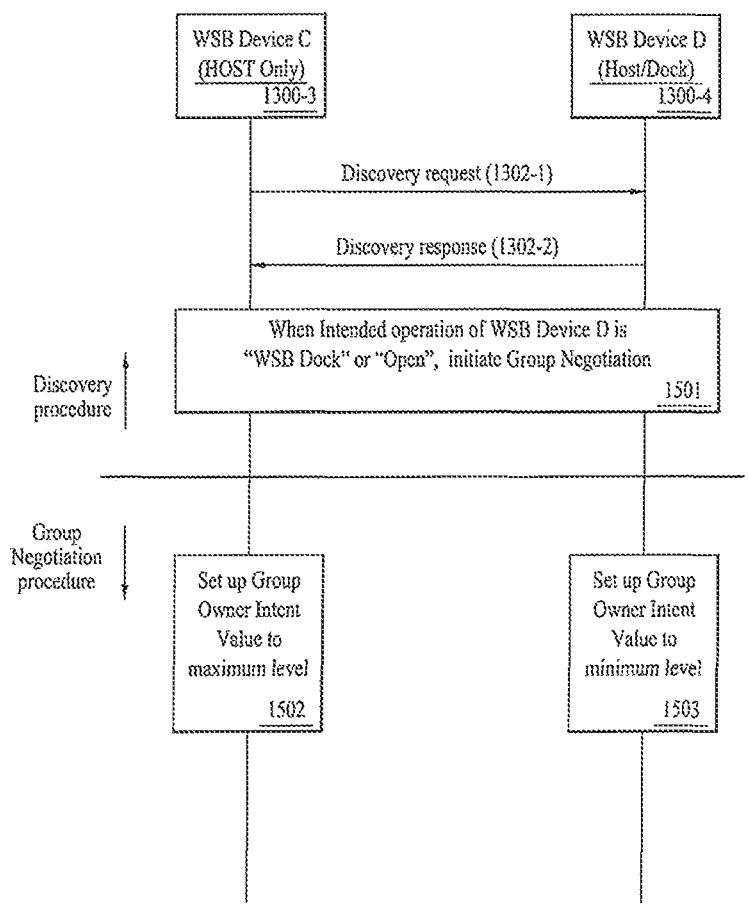
FIG. 16 and FIG. 17 respectively illustrate flow charts showing a WSB connection establishment procedure in order to describe the exemplary embodiment of the present invention.
Figure 17:
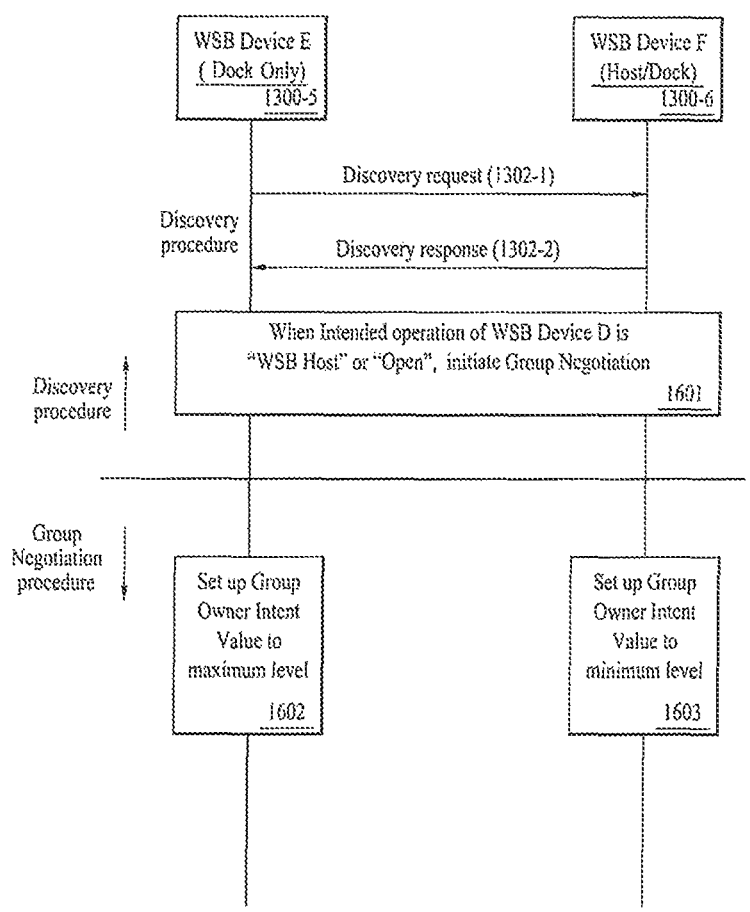

FIG. 16 and FIG. 17 respectively illustrate flow charts showing a WSB connection establishment procedure in order to describe the exemplary embodiment of the present invention.

FIG. 16 illustrates a drawing showing a procedure of establishing connection between a C device (1300-3) being capable of supporting only the host device and a D device (1300-4) being capable of supporting both the host and dock devices.

In the flow chart of FIG. 16, based upon a borderline, the upper portion of the borderline illustrates a discovery (or discovery) procedure, and the lower portion of the borderline illustrates a Group Negotiation procedure. During the discovery procedure, the C device (1300-3) and the D device (1300-4) may exchange the WSB IE of one another. More specifically, the WSB IE may be received and transmitted through a discovery request (or discovery request) (1302-1) and a discovery response (or discovery response) (1302-2). Accordingly, the function that can be supported by each counterpart may be recognized. Most particularly, the D device (1300-4) may verify that the C device (1300-3) only supports the host device through the WSB IE, which is exchanged during the discovery (or discovery) procedure.

In the situation as shown in FIG. 16, in accordance with the intended operation information, either the connection may be established, or the connection may not be established. This is because, since the C device (1300-3) may support only the host device, the D device (1300-4) may eventually prefer to perform only the functions as the host device.

Therefore, when the intended operation information of the D device (1300-4) wishes to operate as the host device, the connection between the C device (1300-3) and the D device (1300-4) is not established.

Meanwhile, when the intended operation information of the D device (1300-4) wishes to operate as the dock device, or if it is irrelevant as to which device the intended operation information wishes to be operated as, the connection may be established. Additionally, in this connection, the C device (1300-3) may be connected as the host device, and the D device (1300-4) may be connected as the dock device.

When detailed description is provided with reference to the flow chart of FIG. 16, in case the C device (1300-3) is decided to function as the host device, and in case the D device (1300-4) is decided to function as the dock device, the Group Negotiation procedure is initiated (Step 1501).

During the Group Negotiation procedure, the C device (1300-3) sets up its Group Owner Intent Value to its maximum level (Step 1502), and the D device (1300-4) sets up its Group Owner Intent Value to its minimum level (Step 1503). As a result, during the Group Negotiation procedure, the C device (1300-3) may be set up as the Owner device, and the D device (1300-4) may be set up as the Client device.

Therefore, in the exemplary embodiment of the present invention, by determining the attribute of each device by using the WSB IE of each device, the Owner and Client devices may be efficiently decided in the wireless communication group.

FIG. 17 illustrates a drawing showing a procedure of establishing connection between an E device (1300-5) being capable of supporting only the dock device and an F device (1300-6) being capable of supporting both the host and dock devices.

In the flow chart of FIG. 17, based upon a borderline, the upper portion of the borderline illustrates a discovery (or discovery) procedure, and the lower portion of the borderline illustrates a Group Negotiation procedure. During the discovery procedure, the E device (1300-5) and the F device (1300-6) may exchange the WSB IE of one another. More specifically, the WSB IE may be received and transmitted through a discovery request (or discovery request) (1302-1) and a discovery response (or discovery response) (1302-2). Accordingly, the function that can be supported by each counterpart may be recognized. Most particularly, the F device (1300-6) may verify that the E device (1300-5) only supports the dock device through the WSB IE, which is exchanged during the discovery (or discovery) procedure.

In the situation as shown in FIG. 17, in accordance with the intended operation information, either the connection may be established, or the connection may not be established. This is because, since the E device (1300-5) may support only the dock device, the E device (1300-6) may eventually prefer to perform only the functions as the dock device.

Therefore, when the intended operation information of the F device (1300-6) wishes to operate as the dock device, the connection between the E device (1300-5) and the F device (1300-6) is not established.

Meanwhile, when the intended operation information of the F device (1300-6) wishes to operate as the host device, or if it is irrelevant as to which device the intended operation information wishes to be operated as, the connection may be established. Additionally, in this connection, the E device (1300-5) may be connected as the dock device, and the F device (1300-6) may be connected as the host device.

When detailed description is provided with reference to the flow chart of FIG. 17, in case the E device (1300-5) is decided to function as the dock device, and in case the F device (1300-6) is decided to function as the host device, the Group Negotiation procedure is initiated (Step 1601).

During the Group Negotiation procedure, the E device (1300-5) sets up its Group Owner Intent Value to its minimum level (Step 1602), and the F device (1300-6) sets up its Group Owner Intent Value to its maximum level (Step 1603). As a result, during the Group Negotiation procedure, the E device (1300-5) may be set up as the Client device, and the F device (1300-6) may be set up as the Owner device.

Therefore, in the exemplary embodiment of the present invention, by determining the attribute of each device by using the WSB IE of each device, the Owner and Client devices may be efficiently decided in the wireless communication group.

Figure 18A:
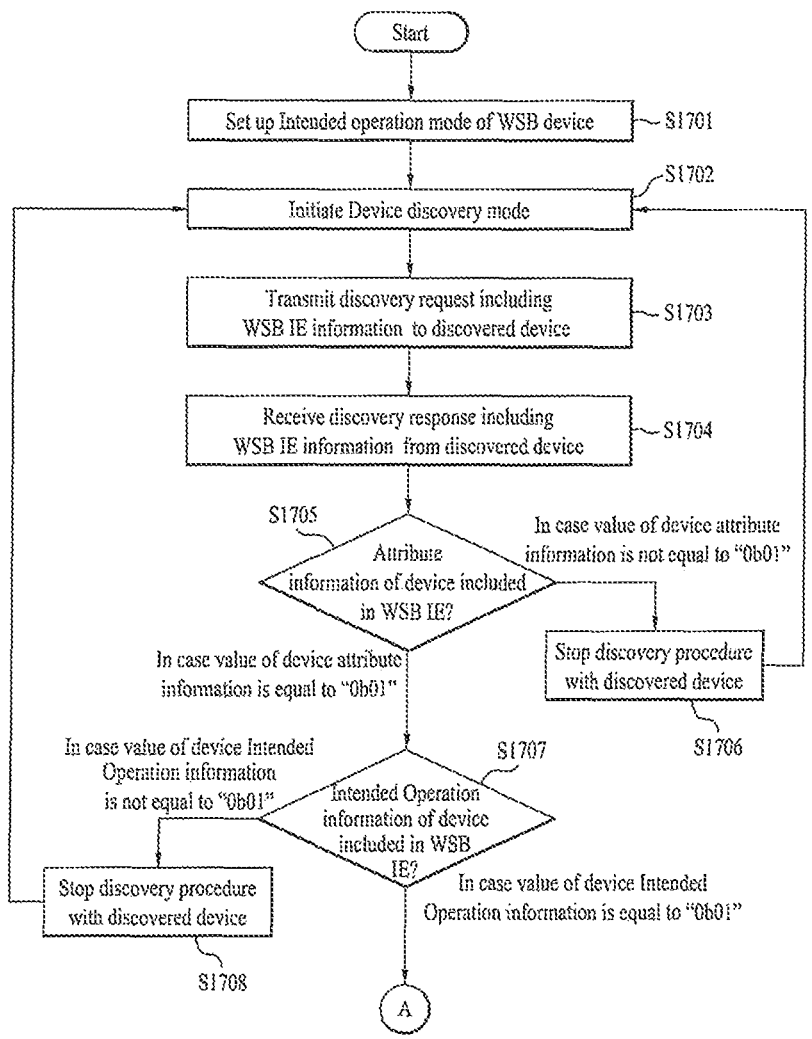
FIG. 18A and FIG. 18B illustrate a flow chart of a method for deciding owner/client devices according to the exemplary embodiment of the present invention.
Figure 18B:
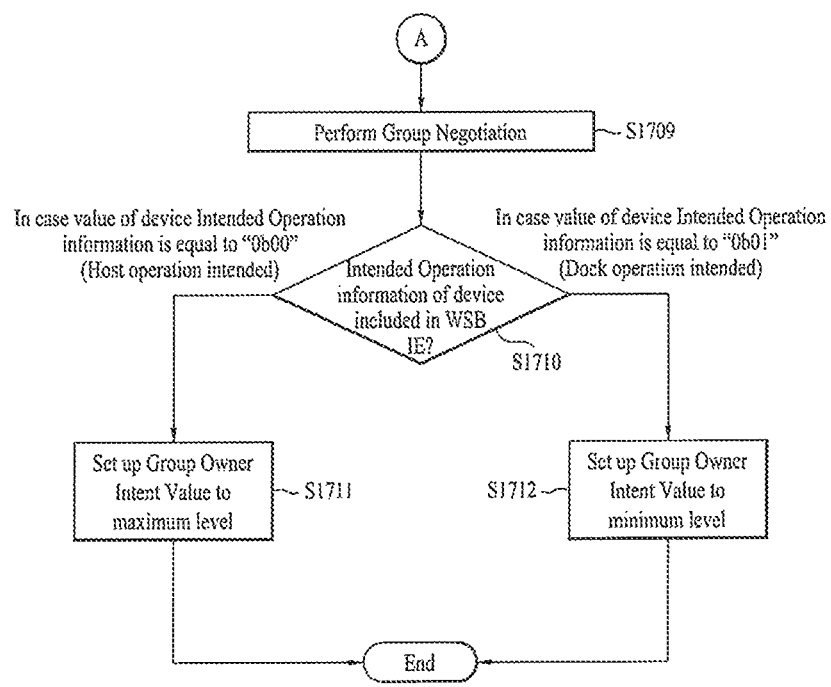

FIG. 18A and FIG. 18B illustrate a flow chart of a method for deciding owner/client devices according to the exemplary embodiment of the present invention.

In step S1701, each of the two devices, the first device and the second device, which intend to establish connection, sets up its intended operation mode. In step S1702 to step S1704, the device discovery (or discovery) procedure is performed by any one of the first device and the second device. Hereinafter, in the following example, a case of performing the discovery (or discovery) procedure by using the first device will be given as the example.

As the first process step of the device discovery procedure (S1702), the first device discovers for the second device. In step S1703, the first device transmits its own WSB IE to the second device. And, in step S1704, a WSB IE is received from the second device. Each device may acquire the WSB IE of its counterpart from steps S1702 and S1703.

In step S1705, attribute information of the device is identified from the exchanged WSB IE. In case the value of the identified device attribute information is not equal to "0b10", the process step is moved to step S1706, and, in case the value of the identified device attribute information is equal to "0b10", the process step is moved to step S1707.

In step S1706, each device stops the performance of the discovery (or discovery) procedure and returns to the device discovery mode (S1702).

In step S1707, each device determines the device intended operation information of the WSB IE. In case the value of the device intended operation is not equal to "0b10", the procedure moves to step S1708, and, in case the value of the identified device attribute information is equal to "0b10", the procedure moves to step S1709.

In step S1708, each device stops the performance of the discovery (or discovery) procedure and returns to step S1702.

In step S1709, each device initiates the Group Negotiation procedure. During the Group Negotiation procedure, each device may vary in accordance with the intended operation information of the WSB IE (S1710). In step S1710, in case the intended operation information is equal to "0b00" (host operation intended), the device is set to the host device, and, in case the intended operation information is equal to "0b01" (dock operation intended), the device is set to the dock device, and the process is ended.

It will be apparent to anyone skilled in the art that the present invention can be embodied to another specific form without departing from the spirit and essential characteristics of the present invention.

The above-described present invention may be realized as a computer-readable code in a medium having a program written therein. The computer-readable medium includes all types of recording devices, which store data that can be read by a computer system. Examples of the computer-readable medium include ROM, RAM, CD-ROM, magnetic tape, floppy disk, optical data storage device, and so on, and may also include media that can be realized in the form of carrier wave (e.g., transmission via Internet).

Therefore, instead of being interpreted with limitations, the detailed description provided above should be considered to be exemplary in all aspects. The scope of the present invention should be decided in accordance with reasonable interpretations of the appended scope, and all modifications and variations within the scope of the present invention and the equivalent are included in the scope of the present invention.

What is claimed is:

1. A method for performing group service discovery by a first device within a Wi-Fi Direct Network, the method comprising:
receiving a first frame from an Owner device, the first frame including a field indicating whether a wireless communication group including the Owner device supports a Group Service Discovery procedure,
wherein the Group Service Discovery procedure corresponds to a service discovery procedure identifying all of services supported by each device belonging to the wireless communication group, and
wherein each device belonging to the wireless communication group is connected to the Owner device through the Wi-Fi Direct Network via wireless connection;
transmitting, a group Service discovery request frame to the Owner device supporting the Group Service Discovery procedure after receiving the first frame,
wherein the group Service discovery request frame is a frame requesting information of protocols supported by each device belonging to the wireless communication group; and
receiving a group Service discovery response frame periodically from the Owner device in response to the group Service discovery request frame,
wherein the group Service discovery response frame includes first information indicating protocols supported by the wireless communication group and second information indicating whether or not a service status is changed.

2. The method of claim 1, wherein the group Service discovery response frame further includes:
device identification information of each device belonging to the wireless communication group; and
supported service information corresponding to each device identification information.

3. The method of claim 2, wherein the group Service discovery request frame includes service identification information indicating a predetermined service, and
wherein the supported service information includes information indicating whether or not the predetermined service is supported.

4. The method of claim 1, wherein the group Service discovery response frame further includes information indicating whether or not information indicating whether services provided by each device belonging to the wireless communication group is currently available.

5. The method of claim 4, wherein the information indicating the current availability indicates any one of availability of a current service, unavailability of a current service, or unclarity in the availability and unavailability of the current service.

6. The method of claim 1, further comprising:
updating information on services being supported by each device belonging to the wireless communication group, when the first device determines that the service status has been changed, based upon the information indicating whether or not the service status is changed.

7. The method of claim 1, wherein each of the group service discovery request frame and the group service discovery response frame is generated by respectively using IEEE (Institute of Electrical and Electronics Engineers) 802.11u of GAS (Generic Advertisement Service).

8. A method for providing information on a service being supported by a wireless communication group to a predetermined device within a Wi-Fi direct network, the method comprising:
transmitting, by an Owner device, a first frame to the predetermined device, the first frame including a field indicating whether the wireless communication group including the Owner device supports a Group Service Discovery procedure,
wherein the Group Service Discovery procedure corresponds to a service discovery procedure identifying all of services supported by each device belonging to the wireless communication group, and
wherein each device belonging to the wireless communication group is connected to the Owner device through the Wi-Fi Direct Network via wireless connection;
receiving, by the Owner device, a group Service discovery request frame from the predetermined device after transmitting the first frame when the Owner device supports the Group Service Discovery procedure,
wherein the group Service discovery request frame is a frame requesting information of protocols supported by each device belonging to the wireless communication group; and
transmitting, by the Owner device supporting the Group Service Discovery procedure, a group Service discovery response frame periodically to the predetermined device in response to the group Service discovery request frame,
wherein the group Service discovery response frame includes first information indicating protocols supported by the wireless communication group and second information indicating whether or not a service status is changed.

9. The method of claim 8, wherein the group Service discovery response frame further includes:
device identification information of each device belonging to the wireless communication group; and
supported service information corresponding to each device identification information.

10. The method of claim 9, wherein the group Service discovery request frame includes service identification information indicating a predetermined service, and
wherein the supported service information includes information indicating whether or not the predetermined service is supported.

11. The method of claim 8, wherein the group Service discovery response frame further includes information indicating whether or not information indicating whether services provided by each device belonging to the wireless communication group is currently available.

12. The method of claim 11, wherein the information indicating the current availability indicates any one of availability of a current service, unavailability of a current service, or unclarity in the availability and unavailability of the current service.

13. The method of claim 8, further comprising:
causing updating, at the predetermined device, of information on services being supported by each device belonging to the wireless communication group, when the predetermined device determines that the service status has been changed, based upon the information indicating whether or not the service status is changed.

14. The method of claim 8, wherein each of the group service discovery request frame and the group service discovery response frame is generated by respectively using IEEE (Institute of Electrical and Electronics Engineers) 802.11u of GAS (Generic Advertisement Service).

15. A device for performing discovery of a service being supported by a wireless communication group, the device comprising:
   a frame transmitter;
   a frame receiver; and
   a controller configured to control the frame transmitter and the frame receiver,
   wherein the controller is further configured to:
   cause the frame receiver to receive a first frame from an Owner device, the first frame including a field indicating whether the wireless communication group including the Owner device supports a Group Service Discovery procedure,
   wherein the Group Service Discovery procedure corresponds to a service discovery procedure identifying all of services supported by each device belonging to the wireless communication group, and
   wherein each device belonging to the wireless communication group is connected to the Owner device through a Wi-Fi Direct Network via wireless connection;
   cause the frame transmitter to transmit a group Service discovery request frame to the Owner device supporting the Group Service Discovery procedure after receiving the first frame,
   wherein the group Service discovery request frame is a frame requesting information of protocols supported by each device belonging to the wireless communication group; and
   cause the frame receiver to receive a group Service discovery response frame periodically from the Owner device in response to the group Service discovery request frame,
   wherein the group Service discovery response frame includes first information indicating protocols supported by the wireless communication group and second information indicating whether or not a service status is changed.

16. An Owner device for providing information on a service being supported by a wireless communication group to a predetermined device, the Owner device comprising:
   a frame transmitter;
   a frame receiver; and
   a controller configured to control the frame transmitter and the frame receiver,
   wherein the controller is further configured to:
   cause the frame transmitter to transmit a first frame to the predetermined device, the first frame including a field indicating whether the wireless communication group including the Owner device supports a Group Service Discovery procedure,
   wherein the Group Service Discovery procedure corresponds to a service discovery procedure identifying all of services supported by each device belonging to the wireless communication group, and
   wherein each device belonging to the wireless communication group is connected to the Owner device through a Wi-Fi Direct Network via wireless connection;
   cause the frame receiver to receive a group Service discovery request frame from the predetermined device after transmitting the first frame when the Owner device supports the Group Service Discovery procedure,
   wherein the group Service discovery request frame is a frame requesting information of protocols supported by each device belonging to the wireless communication group; and
   cause the frame transmitter to transmit a group Service discovery response frame periodically to the predetermined device in response to the group Service discovery request frame,
   wherein the group Service discovery response frame includes first information indicating protocols supported by the wireless communication group and second information indicating whether or not a service status is changed.

17. The method of claim 1, wherein the Owner device is configured to:
   connect each device belonging to the wireless communication group; and
   identify information related to each device belonging to the wireless communication group.

* * * * *